(12) United States Patent
Jeong

(10) Patent No.: US 11,254,277 B2
(45) Date of Patent: Feb. 22, 2022

(54) ROOF AIRBAG APPARATUS

(71) Applicant: Hyundai Mobis Co., Ltd., Seoul (KR)

(72) Inventor: Hun Hee Jeong, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/104,613

(22) Filed: Nov. 25, 2020

(65) Prior Publication Data

US 2021/0155197 A1 May 27, 2021

(30) Foreign Application Priority Data

Nov. 26, 2019 (KR) .......................... 10-2019-0153036

(51) Int. Cl.
| | | |
|---|---|---|
| *B60R 21/214* | (2011.01) | |
| *B60R 21/13* | (2006.01) | |
| *B60R 21/013* | (2006.01) | |
| *B60R 21/2334* | (2011.01) | |
| *B60R 21/231* | (2011.01) | |

(52) U.S. Cl.
CPC .......... *B60R 21/214* (2013.01); *B60R 21/013* (2013.01); *B60R 21/13* (2013.01); *B60R 21/2334* (2013.01); *B60R 2021/23192* (2013.01)

(58) Field of Classification Search
CPC .. B60R 21/214; B60R 21/213; B60R 21/2334
See application file for complete search history.

(56) References Cited

U.S. PATENT DOCUMENTS

| | | | |
|---|---|---|---|
| 6,189,960 B1* | 2/2001 | Mumura | B60J 7/0015 |
| | | | 160/7 |
| 9,610,915 B2* | 4/2017 | Specht | B60R 21/214 |
| 9,744,932 B1* | 8/2017 | Faruque | B60R 21/16 |
| 9,771,048 B2* | 9/2017 | Min | B60R 21/214 |
| 9,789,840 B2* | 10/2017 | Farooq | B60R 21/214 |
| 9,902,362 B2* | 2/2018 | Farooq | B60N 2/14 |
| 10,399,527 B2* | 9/2019 | Schutt | B60R 21/08 |
| 10,471,924 B2* | 11/2019 | Min | B60R 21/233 |
| 10,589,708 B2* | 3/2020 | Cho | B60R 21/2338 |
| 10,604,104 B2* | 3/2020 | Raikar | B60R 21/23184 |

(Continued)

FOREIGN PATENT DOCUMENTS

| | | | | |
|---|---|---|---|---|
| DE | 102011051318 A1 * | 5/2012 | .......... | B60R 21/231 |
| DE | 102015121092 A1 * | 6/2016 | .......... | B60R 21/231 |

(Continued)

*Primary Examiner* — Nicole T Verley
(74) *Attorney, Agent, or Firm* — H.C. Park & Associates, PLC

(57) ABSTRACT

A roof airbag apparatus including a rear cushion unit deployed from a rear part toward a front part of a roof when gas is supplied, and covering a rear region of the roof; a front cushion unit coupled to a front end of the rear cushion unit to communicate therewith, deployed forward when the rear cushion unit is deployed, and covering a front region of the roof; a pair of guide bars guiding left and right ends of the rear cushion unit and the front cushion unit at left and right sides of the roof; and a pair of connection members coupled to front ends of the guide bars in a state in which the pair of connection members are fixed to the front part of the roof, and decoupled from the guide bars and deploying the front cushion unit downward when a front collision sensing signal is transferred.

11 Claims, 6 Drawing Sheets

(56) References Cited

U.S. PATENT DOCUMENTS

| | | | |
|---|---|---|---|
| 10,625,701 B2 * | 4/2020 | Cho | B60R 21/214 |
| 10,703,324 B2 * | 7/2020 | Hill | B60R 21/231 |
| 10,730,470 B2 * | 8/2020 | Choi | B60R 21/214 |
| 10,807,556 B2 * | 10/2020 | Hill | B60R 21/232 |
| 10,875,488 B2 * | 12/2020 | Kanegae | B60R 21/2338 |
| 11,040,687 B2 * | 6/2021 | Jayakar | B60R 21/214 |
| 11,059,449 B2 * | 7/2021 | Jayakar | B60R 21/01554 |
| 2002/0125690 A1 * | 9/2002 | Boll | B60R 21/213 280/730.1 |
| 2002/0167202 A1 * | 11/2002 | Pfalzgraf | B60J 7/0015 296/214 |
| 2009/0295131 A1 * | 12/2009 | Kim | B60R 21/214 280/730.1 |
| 2015/0137490 A1 * | 5/2015 | Specht | B60R 21/214 280/728.2 |
| 2017/0015269 A1 * | 1/2017 | Min | B60R 21/2338 |
| 2018/0009348 A1 * | 1/2018 | Deshmukh | B60N 2/509 |
| 2018/0162314 A1 * | 6/2018 | Lee | B60R 21/213 |
| 2019/0016292 A1 * | 1/2019 | Son | B60R 21/233 |
| 2019/0217804 A1 * | 7/2019 | Cho | B60R 21/214 |
| 2019/0337479 A1 * | 11/2019 | Hill | B60R 21/01512 |
| 2019/0366968 A1 * | 12/2019 | Park | B60R 21/214 |
| 2020/0070763 A1 * | 3/2020 | Hill | B60R 21/233 |
| 2020/0223387 A1 * | 7/2020 | Min | B60R 21/233 |
| 2021/0138996 A1 * | 5/2021 | Min | B60R 21/214 |
| 2021/0237675 A1 * | 8/2021 | Min | B60R 21/2334 |

FOREIGN PATENT DOCUMENTS

| | | | | |
|---|---|---|---|---|
| DE | 202020100026 U1 * | 1/2020 | | B60R 21/213 |
| DE | 102020117727 A1 * | 1/2021 | | B60R 21/214 |
| JP | H11222037 A * | 8/1999 | | |
| JP | 2015020509 A * | 2/2015 | | |
| JP | 2020117113 A * | 8/2020 | | |
| KR | 20050101393 A * | 10/2005 | | |
| KR | 20210049254 A * | 5/2021 | | |

* cited by examiner

ROOF AIRBAG APPARATUS

CROSS-REFERENCE TO RELATED APPLICATION

This application claims priority from and the benefit of Korean Patent Application No. 10-2019-0153036, filed on Nov. 26, 2019, which is hereby incorporated by reference for all purposes as if set forth herein.

BACKGROUND

Field

Exemplary embodiments of the present disclosure relate to a roof airbag apparatus, and more particularly, to a roof airbag apparatus which can change a deployment direction of a front cushion so as to respond to a rollover accident or a collision accident of a vehicle, thereby preventing a passenger from being thrown out of the vehicle through a roof space and preventing a rear seat passenger from being thrown forward and injured due to shock.

Discussion of the Background

In general, an airbag apparatus is installed in a vehicle for the sake of safety of a passenger. A roof airbag apparatus is installed on a panorama roof which is positioned on a ceiling of the vehicle.

Such a roof airbag apparatus is inflated and deployed upon occurrence of a rollover accident of the vehicle so as to prevent a passenger from being injured or thrown out of the vehicle, and has a structure in which a cushion is inflated by gas introduced from a gas supply unit (an inflator) and thereby closes a roof space.

In addition, a rear seat airbag apparatus for protecting a passenger is applied to a rear seat space of the vehicle. The rear seat airbag apparatus is installed on a side surface of a cabin or a seat back of a first row seat, thereby preventing injury to the passenger caused by a front impact and a side impact.

However, in the related art, since the roof airbag apparatus and the rear seat airbag apparatus are installed at different positions, a large number of parts need to be applied, and it is difficult to secure spaces for installing the airbag apparatuses.

The above information disclosed in this Background section is only for enhancement of understanding of the background of the invention and, therefore, it may contain information that does not constitute prior art.

SUMMARY

Exemplary embodiments of the present invention provide a roof airbag apparatus which can close a roof space by deploying a rear cushion unit and a front cushion unit forward when a rollover accident of a vehicle occurs and can deploy the front cushion unit downward to the front of a rear seat passenger when a front collision accident of the vehicle occurs, thereby preventing a passenger from being thrown out of the vehicle through the roof space and preventing a rear seat passenger from being thrown forward and injured due to shock.

An exemplary embodiment of the present invention provides a roof airbag apparatus including: a rear cushion unit deployed from a rear part toward a front part of a roof when gas is supplied from an outside, and covering a rear region of the roof; a front cushion unit coupled to a front end of the rear cushion unit to communicate therewith, deployed forward when the rear cushion unit is deployed, and covering a front region of the roof; a pair of guide bars guiding both left and right ends of the rear cushion unit and the front cushion unit at left and right sides of the roof; and a pair of connection members coupled to front ends of the guide bars in a state in which the pair of connection members are fixed to the front part of the roof, and decoupled from the guide bars and deploying the front cushion unit downward when a front collision sensing signal is transferred.

Boarding spaces may be formed below the rear region and the front region, respectively, and the front cushion unit may be deployed between the boarding space below the rear region and the boarding space below the front region when the front ends of the guide bars and the connection members are decoupled from each other.

A seat back of a seat may be disposed in the boarding space below the front region, and the front cushion unit may be deployed to a rear surface of the seat back when the front ends of the guide bars and the connection members are decoupled from each other.

The connection members may maintain connection states with the front ends of the guide bars when a vehicle rollover sensing signal is transferred, to horizontally deploy the rear cushion unit and the front cushion unit forward.

The front cushion unit may be connected to the front end of the rear cushion unit is such that the front cushion unit is able to be bent downward from the front end of the rear cushion unit so as to be deployed downward when the connection members and the front ends of the guide bars are decoupled from each other.

The guide bars may include: first guide parts installed at left and right sides of the rear region, and guiding both the left and right ends of the rear cushion unit; and second guide parts installed at left and right sides of the front region in a state in which the second guide parts are connected to front ends of the first guide parts, and guiding both the left and right ends of the front cushion unit, wherein the second guide parts are rotated downward with respect to the front ends of the first guide parts when the second guide parts are decoupled from the connection members.

Tensions may act on the second guide parts in a front-rear direction when front ends of the second guide parts are connected with the connection members, and the second guide parts may be rotated downward together with the front cushion unit as the tensions are released when the front ends of the second guide parts are disconnected from the connection members.

A first connection ring may be formed at the front end of the first guide part, and a second connection ring may be formed at a rear end of the second guide part to be rotatably coupled with the first connection ring.

A coupler may project from the front end of the second guide part to be coupled with a corresponding end of the connection member in a male and female relationship, and the connection member may be converted into a decoupling state and may release coupling with the coupler when the front collision sensing signal is transferred.

The second guide parts may be made of a material such as resin or fiber.

A collision sensor for sensing a front collision may be electrically connected to the connection members.

The roof airbag apparatus according to the embodiments of the present disclosure can close a roof space by deploying a rear cushion unit and a front cushion unit forward when a rollover accident of a vehicle occurs and can deploy the front cushion unit downward to the front of a rear seat passenger when a front collision accident of the vehicle occurs, thereby preventing a passenger from being thrown out of the vehicle through the roof space and preventing a rear seat passenger from being thrown forward and injured due to shock.

Also, in the roof airbag apparatus according to the embodiments of the present disclosure, since a front region of a rear seat passenger and a rear region of the roof space are simultaneously covered upon occurrence of a front collision accident of the vehicle, it is possible to prevent the rear seat passenger from being thrown out of the vehicle through the roof space even when a rollover accident occurs after the front collision of the vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
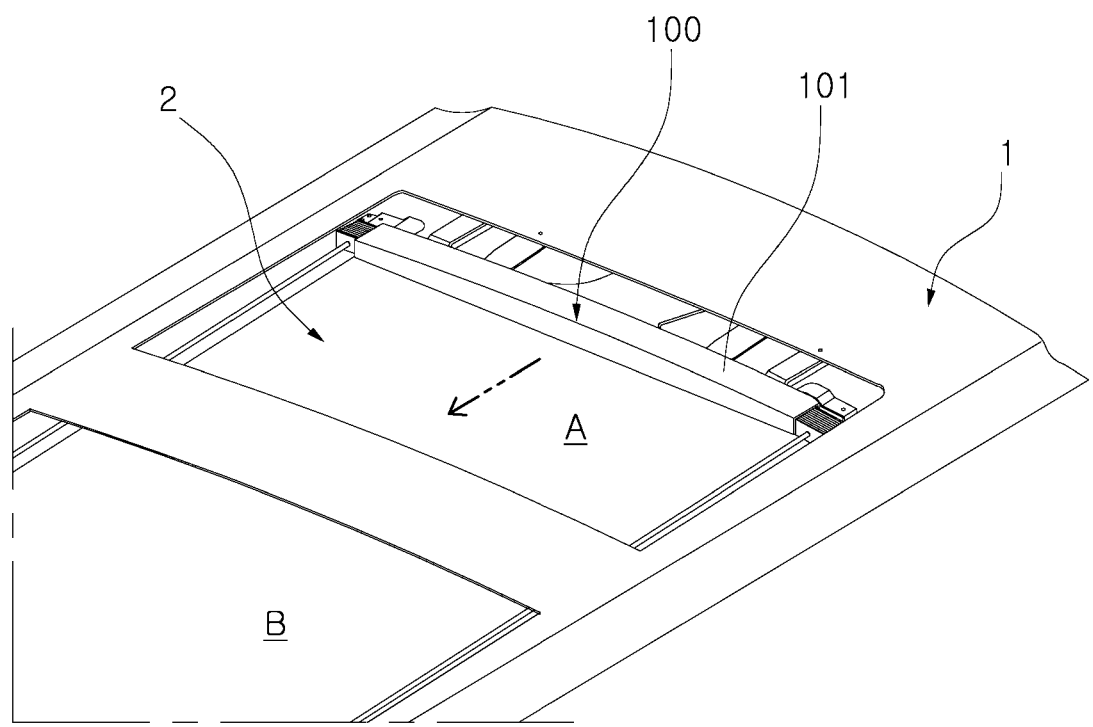
FIG. 1 is a perspective view illustrating a state in which a roof airbag apparatus in accordance with an embodiment of the present disclosure is installed on a roof of a vehicle.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, embodiments of the present disclosure will be described in detail with reference to the accompanying drawings.

Advantages and features of the disclosure and methods to achieve them will become apparent from the descriptions of exemplary embodiments herein below with reference to the accompanying drawings.

However, the disclosure is not limited to the exemplary embodiments disclosed herein but may be implemented in various different ways. The exemplary embodiments are provided for making the disclosure thorough and for fully conveying the scope of the disclosure to those skilled in the art to which the disclosure pertains. It is to be noted that the scope of the disclosure is defined only by the claims.

When it is determined that a related publicly-known technology or the like unnecessarily obscures the subject matter of the present disclosure, the detailed descriptions thereof will be omitted.

Figure 2:
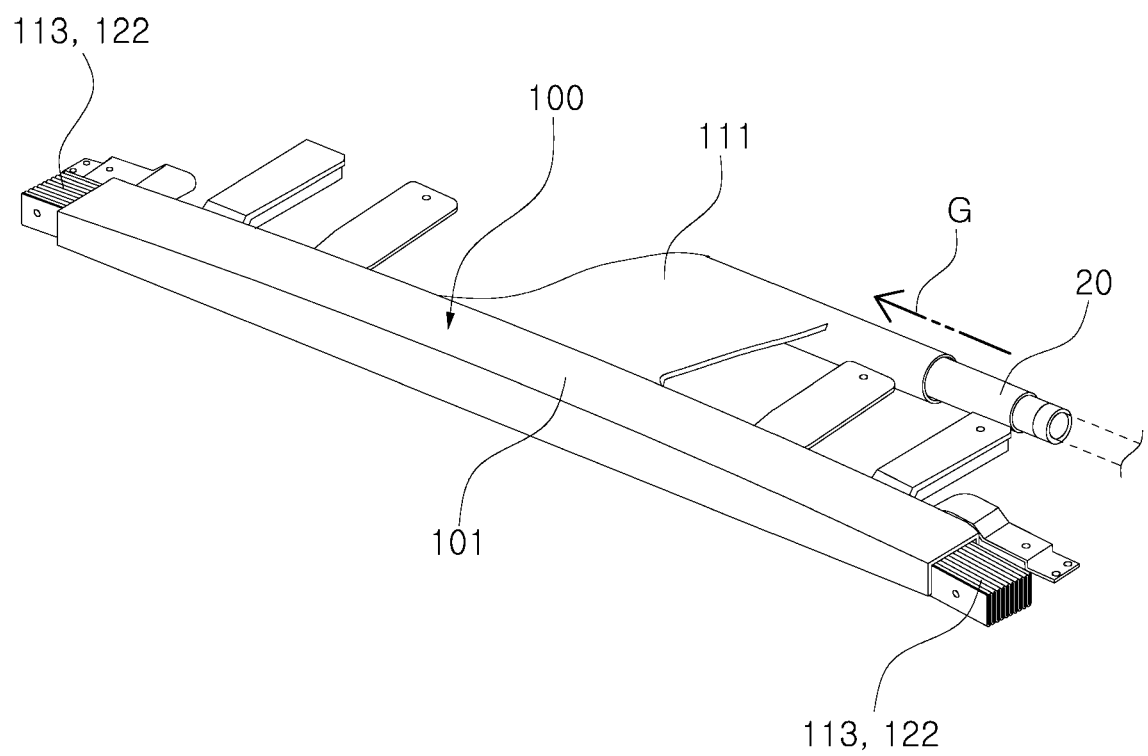
FIG. 2 is a perspective view illustrating the roof airbag apparatus in accordance with the embodiment of the present disclosure.

FIG. 1 is a perspective view illustrating a state in which a roof airbag apparatus in accordance with an embodiment of the present disclosure is installed on a roof of a vehicle, and FIG. 2 is a perspective view illustrating the roof airbag apparatus in accordance with the embodiment of the present disclosure.

Figure 3:
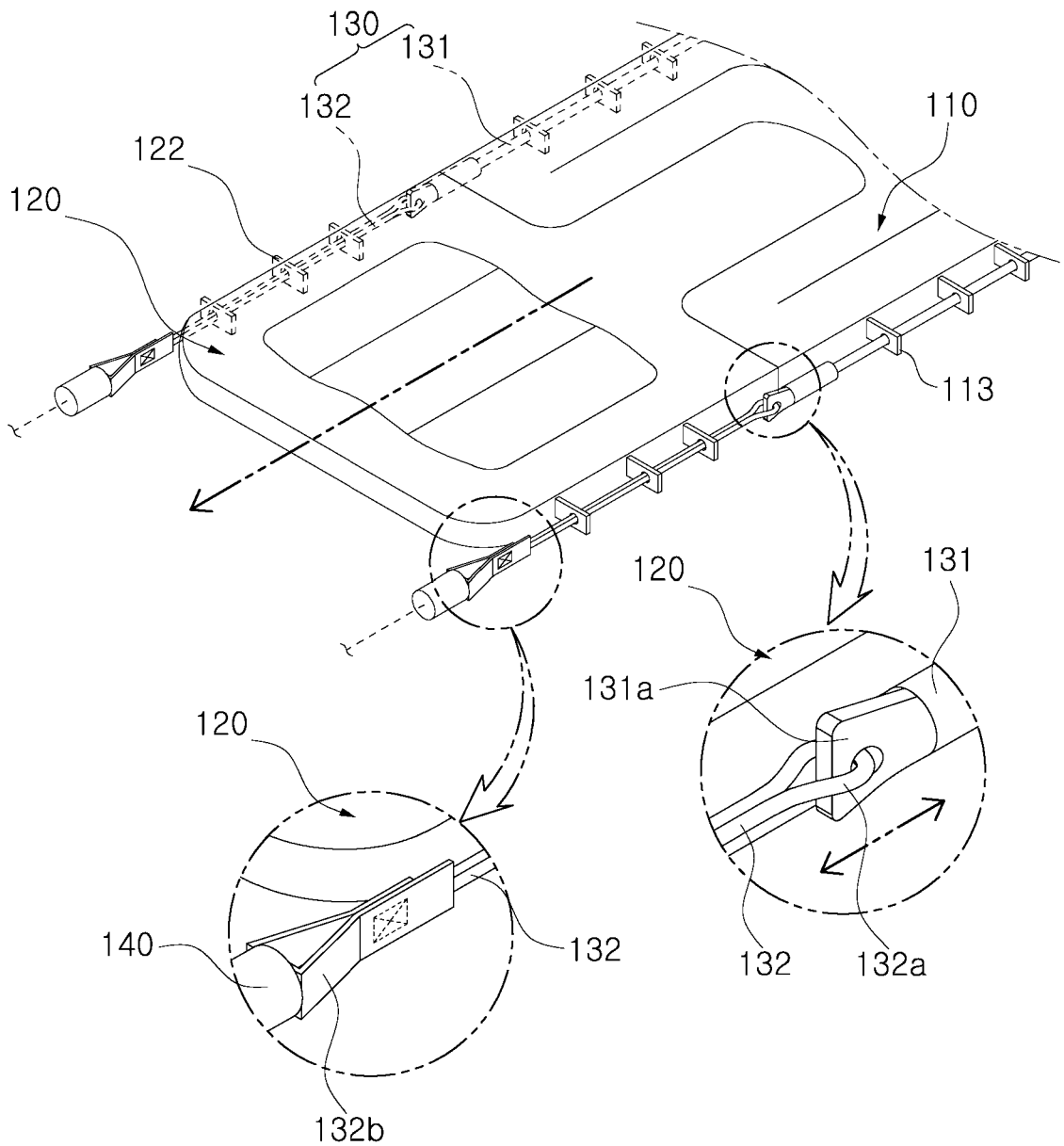
FIG. 3 is a perspective view illustrating a guide, a rear cushion unit, and a front cushion unit of the roof airbag apparatus in accordance with the embodiment of the present disclosure.
Figure 4:
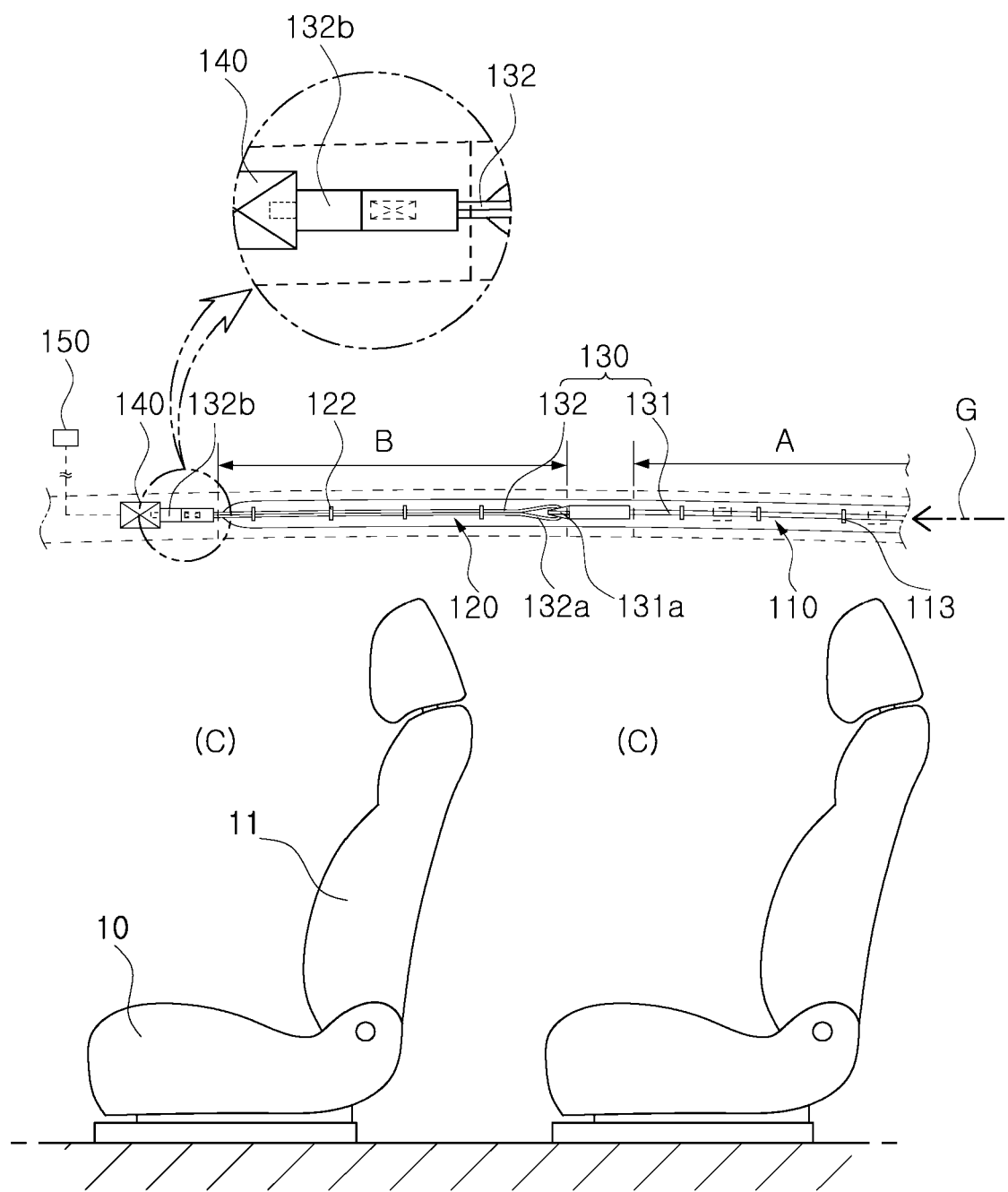
FIG. 4 is a side view illustrating a state in which the rear cushion unit and the front cushion unit of the roof airbag apparatus in accordance with the embodiment of the present disclosure are deployed forward when the vehicle rolls over.

FIG. 3 is a perspective view illustrating a guide, a rear cushion unit and a front cushion unit of the roof airbag apparatus in accordance with the embodiment of the present disclosure, and FIG. 4 is a side view illustrating a state in which the rear cushion unit and the front cushion unit of the roof airbag apparatus in accordance with the embodiment of the present disclosure are deployed forward when the vehicle rolls over.

Figure 5:
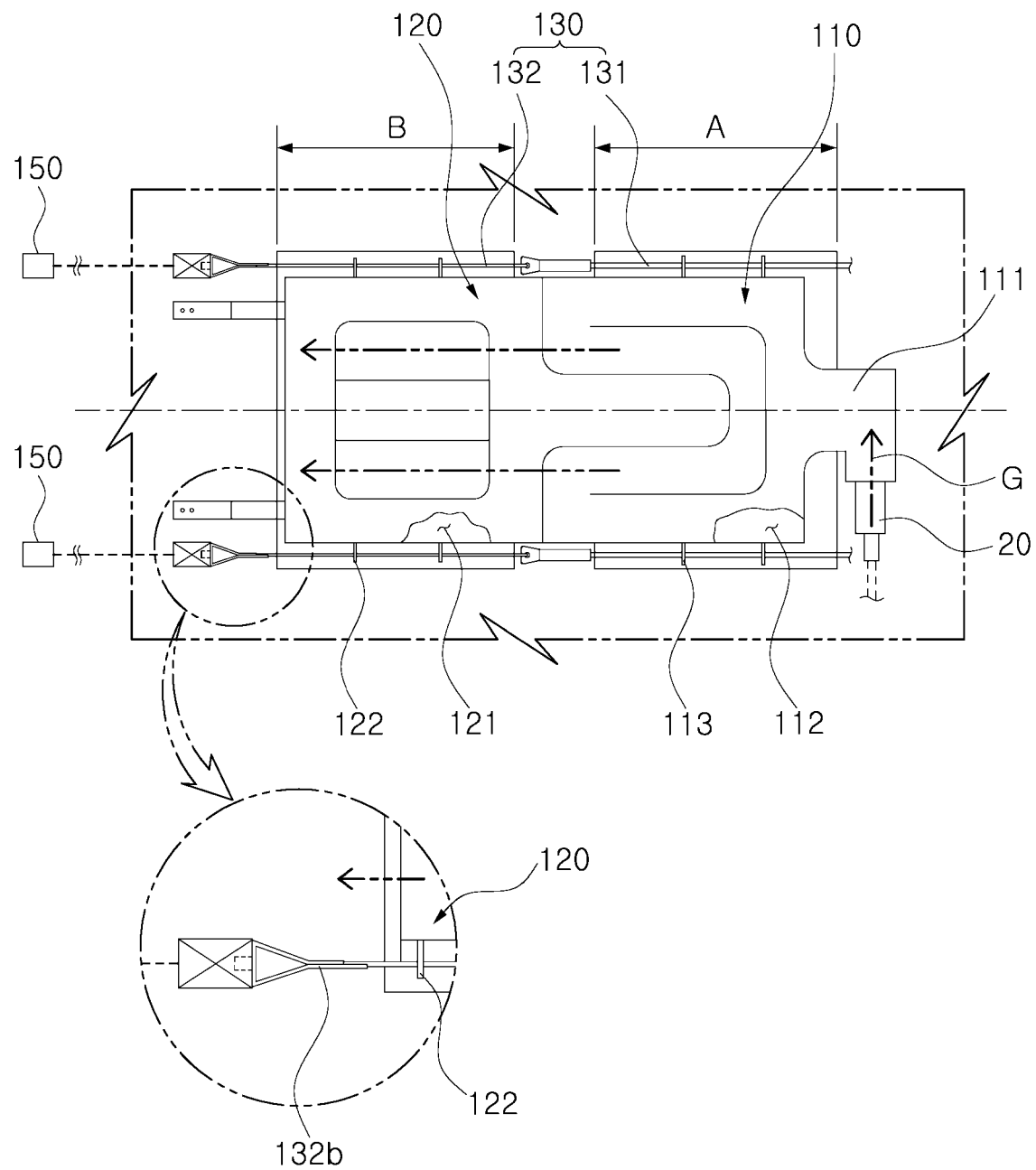
FIG. 5 is a bottom view illustrating the state in which the rear cushion unit and the front cushion unit of the roof airbag apparatus in accordance with the embodiment of the present disclosure are deployed forward when the vehicle rolls over.
Figure 6:
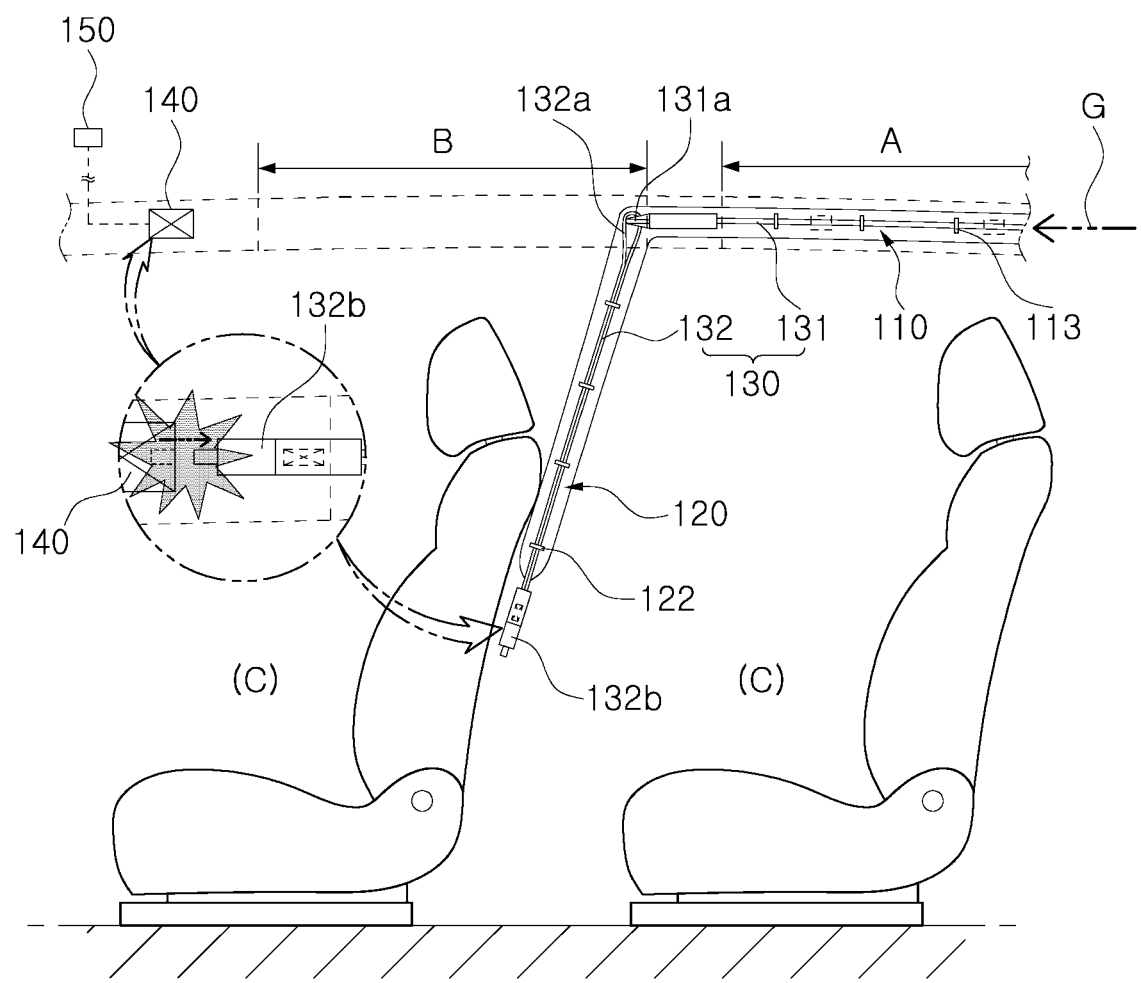
FIG. 6 is a side view illustrating a state in which the rear cushion unit and the front cushion unit of the roof airbag apparatus in accordance with the embodiment of the present disclosure are deployed forward upon a front collision of the vehicle.

FIG. 5 is a bottom view illustrating the state in which the rear cushion unit and the front cushion unit of the roof airbag apparatus in accordance with the embodiment of the present disclosure are deployed forward when the vehicle rolls over, and FIG. 6 is a side view illustrating a state in which the rear cushion unit and the front cushion unit of the roof airbag apparatus in accordance with the embodiment of the present disclosure are deployed forward upon a front collision of the vehicle.

As illustrated in FIGS. 1 to 6, a roof airbag apparatus 100 in accordance with the embodiment of the present disclosure includes a rear cushion unit 110, a front cushion unit 120, a pair of guide bars 130, and a pair of connection members (TRUs: tether release units) 140.

A discharge part of a gas supply unit (an inflator) 20 for supplying inflation gas G is coupled to a rear part of the rear cushion unit 110. When the inflation gas G is supplied into the rear cushion unit 110, the rear cushion unit 110 is deployed from a rear part to a front part of a roof 1, and thereby, covers a rear region A of the roof 1.

A first filling space 112 is formed in the rear cushion unit 110 so that the gas G supplied from the gas supply unit 20 is filled in the first filling space 112.

The gas supply unit 20 may generate the gas G by being ignited in such a manner that an ignition device (not illustrated) ignites powder by a sensing signal from a collision sensor 150.

The first filling space 112 may be divided into a plurality of spaces which communicate with one another, thereby forming a moving path of the gas G introduced through an inlet port 111 disposed at a rear part.

The inlet port 111, to which the discharge part of the gas supply unit 20 is connected, may be formed at the read end of the rear cushion unit 110 to communicate with the first filling space 112.

The front cushion unit 120 is coupled to the front end of the rear cushion unit 110 in such a way to communicate with the rear cushion unit 110. In the case where the rear cushion unit 110 is deployed, the front cushion unit 120 is deployed forward, and thereby, covers a front region B of the roof 1.

A second filling space 121, which communicates with the first filling space 112 of the rear cushion unit 110 in a front-rear direction, is formed in the front cushion unit 120.

The second filling space 121 may be divided into a plurality of spaces which communicate with one another, thereby forming a moving path of the gas G introduced from the first filling space 112.

The front cushion unit 120 may be connected to the front end of the rear cushion unit 110 such that the front cushion unit 120 may be bent downward from the front end of the rear cushion unit 110 to be deployed downward when the connection members 140 to be described later are decoupled from the front ends of the guide bars 130 to be described later.

Boarding spaces (C) may be formed below the rear region A and the front region B, respectively, as illustrated in FIGS. 4 and 6, and a seat back 11 of a seat 10 may be disposed in the boarding space (C) below the front region B.

In this case, the front cushion unit 120 may be deployed downward between the boarding space (C) below the rear region A and the boarding space (C) below the front region B when a front collision occurs.

The front cushion unit 120, which is deployed to the boarding space (C) below the rear region A, protects, at the front, a passenger seated on a rear seat of a vehicle.

The front cushion unit 120, which is deployed to the boarding space (C) below the rear region A, may be deployed to be kept vertical or inclined, and may be supported by the seat back 11 of the seat 10 positioned in front of the boarding space (C) for the rear seat.

The pair of guide bars 130 function to guide both the left and right ends of the rear cushion unit 110 and the front cushion unit 120 in the front-rear direction at left and right sides of the roof 1.

The pair of guide bars 130 may include a pair of first guide parts 131 and a pair of second guide parts 132 which extend in the front-rear direction as illustrated in FIG. 5.

As illustrated in FIG. 5, the pair of first guide parts 131 are installed at left and right sides, respectively, of the rear region A, and thereby, guide both the left and right ends of the rear cushion unit 110.

The first guide parts 131 may be installed to correspond to the left and right sides of the rear region A, and the rear cushion unit 110 may be coupled to the first guide parts 131 such that both the left and right ends of the rear cushion unit 110 may be slidingly moved along the first guide parts 131 in the front-rear direction.

To this end, connection parts 113 capable of sliding movement along the first guide parts 131 may be provided at both the left and right ends of the rear cushion unit 110.

A guide hole may be formed through each connection part 113 of the rear cushion unit 110 in the front-rear direction such that the first guide part 131 may pass through the guide hole.

A housing 101 for receiving the rear cushion unit 110 and the front cushion unit 120 may be installed at the rear of the roof 1.

That is to say, the rear cushion unit 110 and the front cushion unit 120 may be received in the housing 101 in a volume-reduced state, and may be deployed through the front of the housing 101 upon deployment.

As illustrated in FIG. 5, the pair of second guide parts 132 are installed to correspond to the left and right sides of the front region B, and thereby, guides both the left and right ends of the front cushion unit 120.

The second guide parts 132 are connected, at the rear ends thereof, to the front ends of the first guide parts 131, and thereby, form moving paths of the front cushion unit 120. The second guide parts 132 may be made of a material such as resin or fiber so that the shape thereof may be deformed.

At least one connection part 122 capable of sliding movement along the second guide parts 132 may be provided at each of both the left and right ends of the front cushion unit 120.

A guide hole may be formed through the connection part 122 of the front cushion unit 120 in the front-rear direction such that the second guide part 132 may pass through the guide hole.

When the second guide parts 132 are connected to the connection members 140 to be described later, the second guide parts 132 may have lengths in the front-rear direction by tensions acting thereon in the front-rear direction.

On the other hand, when the second guide parts 132 are disconnected from the connection members 140 to be described later, the second guide parts 132 may be deformed downward together with the front cushion unit 120 as the tensions are released.

A first connection ring 131*a* may be formed at the front end of the first guide part 131, and a second connection ring 132*a* may be formed at the rear end of the second guide part 132 to be rotatably coupled with the first connection ring 131*a*.

In other words, by the coupling of the first connection ring 131*a* and the second connection ring 132*a*, the first guide part 131 and the second guide part 132 may be connected in the front-rear direction, and the second connection ring 132*a* may be rotated downward with respect to the first connection ring 131*a*.

A coupler 132*b* may project from the front end of the second guide part 132 so as to be coupled with a corresponding end of the connection member 140 to be described later in a male and female relationship.

The pair of connection members 140 may maintain connection states with the front ends of the second guide parts 132 when a vehicle rollover sensing signal is transferred, and may horizontally deploy the rear cushion unit 110 and the front cushion unit 120 forward.

The coupling end of the connection member 140 may be coupled with the coupler 132*b* of the second guide part 132 in a male and female relationship, but, if necessary, various coupling structures may be applied to the connection member 140 and the front end of the second guide part 132.

The pair of connection members 140 are coupled to the front ends of the second guide parts 132 in a state in which the pair of connection members 140 are fixed to the front part of the roof 1, and are decoupled from the front ends of the second guide parts 132 when a front collision sensing signal is transferred.

To this end, the collision sensor 150 for sensing a front collision may be electrically connected to the connection members 140. The collision sensor 150 may be installed in the vehicle.

Hereinafter, deployment processes of the roof airbag apparatus in accordance with the embodiment of the present disclosure upon occurrence of a vehicle rollover accident and a vehicle front collision accident will be described as follows with reference to FIGS. 1 to 6.

First, when a vehicle rollover accident occurs, the gas supply unit 20 operates by the transfer of a sensing signal from a vehicle rollover sensing unit (not illustrated), as described above with reference to FIGS. 3 to 5.

By the supply of gas from the gas supply unit 20, the rear cushion unit 110 is deployed toward the front part of the roof 1, and the front cushion unit 120 is deployed forward.

In this process, the rear cushion unit 110 is horizontally positioned while horizontally closing the rear region A of the roof 1, and the front cushion unit 120 is horizontally positioned while closing the front region B of the roof 1.

In this state, the rear cushion unit 110 is positioned above the boarding space (C) for the rear seat (a second row seat) positioned inside the vehicle, and the front cushion unit 120 is positioned above the boarding space (C) for a front seat (a first row seat) positioned inside the vehicle.

Namely, since a predetermined tension acts on each of the second guide parts 132 in a lengthwise direction thereof, the front cushion unit 120 may maintain a horizontally deployed state as illustrated in FIGS. 4 and 5.

In this way, since the rear cushion unit 110 and the front cushion unit 120 close the rear region A and the front region B of the roof 1, respectively, a passenger is prevented from being thrown out of the vehicle through a roof space 2 upon occurrence of a vehicle rollover accident.

On the other hand, when a vehicle front collision accident occurs, the connection members 140 perform decoupling operations by the transfer of a front collision sensing signal from the collision sensor 150, as described above with reference to FIG. 6.

The front ends of the second guide parts 132 are decoupled from the coupling ends of the connection members 140, and at the same time, the gas supply unit 20 operates by the transfer of the front collision sensing signal from the collision sensor 150.

By the supply of gas from the gas supply unit 20, the rear cushion unit 110 is deployed toward the front part of the roof 1, and the front cushion unit 120 is deployed forward.

In this process, the rear cushion unit 110 is horizontally positioned while horizontally closing the rear region A of the roof 1, and the front cushion unit 120 is deployed downward and is positioned in the boarding space (C) for the rear seat.

In this state, the rear cushion unit 110 is positioned above the boarding space (C) for the rear seat (the second row seat) positioned inside the vehicle, and the front cushion unit 120 is positioned to be kept vertical or inclined in front of the boarding space (C) for the rear seat (the second row seat).

Namely, since the second guide parts 132 are decoupled from the connection members 140 and thus the tensions acting thereon are released, the front cushion unit 120 may be deployed downward.

In this way, since the front cushion unit 120 is deployed to the front of the rear seat, a passenger may be prevented from being thrown forward or injured due to shock upon occurrence of a vehicle front collision.

As is apparent from the above description, the roof airbag apparatus according to the embodiment of the present disclosure can close the roof space 2 by deploying the rear cushion unit 110 and the front cushion unit 120 forward when a vehicle rollover accident occurs and can deploy the front cushion unit 120 downward to the front of a rear seat passenger when a vehicle front collision accident occurs, thereby preventing a passenger from being thrown out of the vehicle through the roof space 2 and preventing a rear seat passenger from being thrown forward and injured due to shock.

Also, in the roof airbag apparatus according to the embodiment of the present disclosure, since a front region of a rear seat passenger and the rear region A of the roof space 2 are simultaneously covered upon occurrence of a vehicle front collision accident, it is possible to prevent the rear seat passenger from being thrown out of the vehicle through the roof space 2 even when a rollover accident occurs after the front collision of the vehicle.

Although a specific embodiment of a roof airbag apparatus according to the present disclosure has been described, it is apparent that various modifications are possible within the scope of the present disclosure.

Therefore, the scope of the present disclosure should not be limited to the above-described embodiments, but should be determined by the scope of the appended claims and equivalents thereof.

It is to be understood that the foregoing embodiments are illustrative and not restrictive in all respects and that the scope of the present disclosure is indicated by the appended claims rather than the foregoing description, It is intended that all changes and modifications derived from the equivalent concept be included within the scope of the present disclosure.

What is claimed is:

1. A roof airbag apparatus comprising:
    a rear cushion unit configured to be deployed from a rear part of a roof toward a front part of the roof when gas is supplied from an outside, and covering a rear region of the roof;
    a front cushion unit coupled to a front end of the rear cushion unit to communicate therewith, configured to be deployed forward when the rear cushion unit is deployed, and covering a front region of the roof;
    a pair of guide bars configured to guide both left and right ends of the rear cushion unit and the front cushion unit at left and right sides of the roof; and
    a pair of connection members coupled to front ends of the guide bars in a state in which the pair of connection members are fixed to the front part of the roof, and decoupled from the guide bars and deploying the front cushion unit downward when a front collision sensing signal is transferred.

2. The roof airbag apparatus according to claim 1, wherein:
    boarding spaces are formed below the rear region and the front region, respectively; and
    the front cushion unit is deployed between the boarding space below the rear region and the boarding space below the front region when the front ends of the guide bars and the connection members are decoupled from each other.

3. The roof airbag apparatus according to claim 2, wherein:
    a seat back of a seat is disposed in the boarding space below the front region; and
    the front cushion unit is deployed to a rear surface of the seat back when the front ends of the guide bars and the connection members are decoupled from each other.

4. The roof airbag apparatus according to claim 1, wherein the connection members maintain connection states with the front ends of the guide bars when a vehicle rollover sensing signal is transferred, so as to horizontally deploy the rear cushion unit and the front cushion unit forward.

5. The roof airbag apparatus according to claim 1, wherein the front cushion unit is connected to the front end of the rear cushion unit such that the front cushion unit is able to be bent downward from the front end of the rear cushion unit so as to be deployed downward when the connection members and the front ends of the guide bars are decoupled from each other.

6. The roof airbag apparatus according to claim 1, wherein the guide bars comprise:
- first guide parts installed at left and right sides of the rear region, and configured to guide both the left and right ends of the rear cushion unit; and
- second guide parts installed at left and right sides of the front region in a state in which the second guide parts are connected to front ends of the first guide parts, and configured to guide both the left and right ends of the front cushion unit,
- wherein the second guide parts are rotated downward with respect to the front ends of the first guide parts when the second guide parts are decoupled from the connection members.

7. The roof airbag apparatus according to claim 6, wherein tensions act on the second guide parts in a front-rear direction when front ends of the second guide parts are connected with the connection members, and the second guide parts are rotated downward together with the front cushion unit as the tensions are released when the front ends of the second guide parts are disconnected from the connection members.

8. The roof airbag apparatus according to claim 6, wherein:
- a first connection ring is formed at the front end of the first guide part; and
- a second connection ring is formed at a rear end of the second guide part to be rotatably coupled with the first connection ring.

9. The roof airbag apparatus according to claim 6, wherein:
- a coupler projects from the front end of the second guide part to be coupled with a corresponding end of the connection member in a male and female relationship; and
- the connection member is converted into a decoupling state and releases coupling with the coupler when the front collision sensing signal is transferred.

10. The roof airbag apparatus according to claim 6, wherein the second guide parts are made of resin or fiber.

11. The roof airbag apparatus according to claim 1, wherein a collision sensor for sensing a front collision is electrically connected to the connection members.

* * * * *